United States Patent
Salameh et al.

(10) Patent No.: US 7,442,422 B2
(45) Date of Patent: Oct. 28, 2008

(54) PROCESS FOR CREATING A SEAL ON A COMPONENT

(75) Inventors: Ralf Salameh, Gondelsheim (DE); Thomas Hemmrich, Bloomfield Hills, MI (US)

(73) Assignee: Federal-Mogul Sealing Systems Bretten GmbH Co. KG, Bretten (DE)

( * ) Notice: Subject to any disclaimer, the term of this patent is extended or adjusted under 35 U.S.C. 154(b) by 676 days.

(21) Appl. No.: 10/844,927

(22) Filed: May 13, 2004

(65) Prior Publication Data

US 2004/0234754 A1 Nov. 25, 2004

(30) Foreign Application Priority Data

May 14, 2003 (DE) ................................. 103 21 584

(51) Int. Cl.
*B29C 65/00* (2006.01)
*C09J 5/02* (2006.01)
*F02F 11/00* (2006.01)
*B29D 22/00* (2006.01)

(52) U.S. Cl. ..................... 428/34.1; 428/35.7; 428/66.4; 156/307.1; 156/307.3; 277/592; 277/594

(58) Field of Classification Search ............... 428/34.1, 428/35.7, 66.4; 156/307.1, 329, 307.3; 277/592, 277/594

See application file for complete search history.

(56) References Cited

U.S. PATENT DOCUMENTS

| 4,273,607 A | 6/1981 | Paul |
| 4,719,065 A * | 1/1988 | Gibbon ........................ 264/135 |
| 5,885,514 A * | 3/1999 | Tensor ......................... 264/478 |

FOREIGN PATENT DOCUMENTS

DE 36 39 218 A1 5/1988

* cited by examiner

*Primary Examiner*—Patricia L Nordmeyer
(74) *Attorney, Agent, or Firm*—Robert L. Stearns; Dickinson Wright PLLC

(57) ABSTRACT

Process for the creation of a seal on a component, in which on one surface of the component which may be pre-treated, a sealant material is applied using screen printing, and by means of a tool at a specific temperature, the geometry of the finished seal is imprinted into the sealant material.

17 Claims, 1 Drawing Sheet

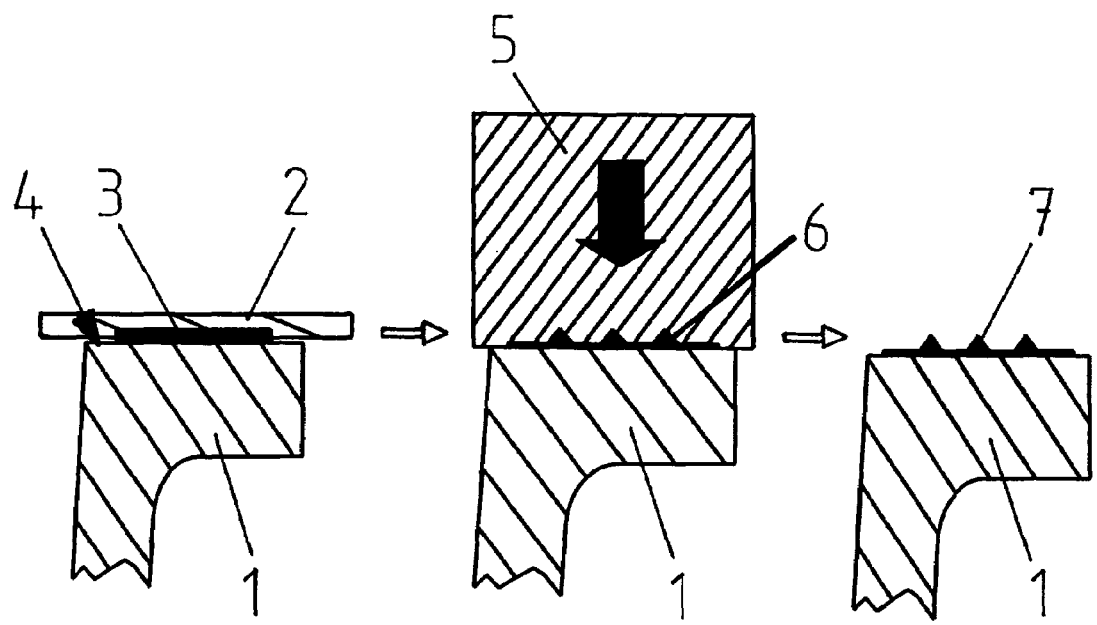
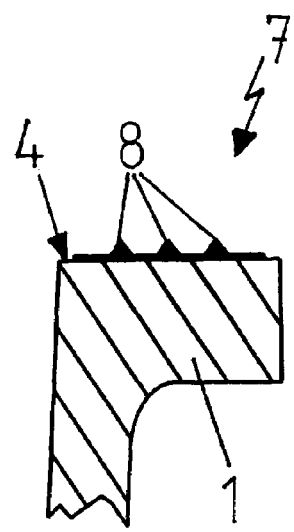

PROCESS FOR CREATING A SEAL ON A COMPONENT

This application claims the priority of German Application No. 103 21 584.0 filed May 14 2003.

BACKGROUND OF THE INVENTION

1. Technical Field

The invention concerns a process for creating a seal on a component.

2. Related Art

Due to great cost pressure, particularly in the automobile industry, cost-effective solutions are sought in many areas of sealing. Increasingly, in this connection, gluing the components is done, which, however, brings with it disadvantages, especially if components are disassembled for repair and must be resealed.

It is well known that seals can be sprayed directly onto covers, in which the component forms a cavity with half of a tool, into which material may be injected. In this, the tool has the shape of the seal. Such a process is described, for example, in DE-A 3 639 218.

Also well know are seals that are operationally connected to components as separate elements.

Through U.S. Pat. No. 4,273,607 a mechanism is known with which a material forming a flat seal may be applied to a component. Using a 180° rotatable tool, the sealant material that has previously been distributed on the tool is applied to the component. The material is air-dried and is not further processed, specifically, it is not remolded.

SUMMARY OF THE INVENTION

The invention has the object of offering a process for the creation of a seal on a component that is at least as cost-effective as is the gluing of components, but does not possess the disadvantages of that process.

This problem is solved by a process for the creation of a seal on a component in which screen printing is used to apply a sealant material to a surface of the component, which has, if required, been pre-treated, and by using a tool at a selected temperature, the geometry of the finished seal is imprinted in the sealant material.

Components manufactured according to the inventive process are therefore provided with an integrated seal, in which the components are made of metal or plastic and are particularly made up of oil pans or covers, i.e. components of the automobile industry.

With the inventive object, the following advantages are achieved:

cost-effective solution for applying the seal directly to the components by imprinting the seal, one may adjust the shape and height of the packing washer as compared to gluing, a definable fashioning is possible as compared to gluing, the connection may be easily loosened as compared to gluing, by defining the height of the packing washer, large component tolerances may be compensated.

In the screen printing process, a sealant material such as silicone or an elastomer material is applied. If required, it may also be necessary that the flange facing of the component, depending on component material or sealant material, be subjected to pre-treatment. After the application of the sealant material by screen printing, a suitable tool is used to imprint the geometry of the packing washers. By the application of a hot tool, the sealant material is cross-linked to an inherently stable seal.

THE DRAWINGS

An embodiment of the invention is illustrated in the drawings as follows:

FIG. 1 shows a series of process steps for the formation of a seal on a component; and FIG. 2 is a fragmentary cross-sectional view of the seal area.

DETAILED DESCRIPTION

FIG. 1 shows the process for the creation of a seal on a component. The component in this example is represented by an oil pan 1. In the screen printing process a suitable tool 2 is used to apply a sealant material 3, in this example, the sealant material being of silicone, onto the surfaces 4 (flange facing) of the oil pan 1. In a subsequent step, the sealant material 3 is brought into operational contact with a preheated tool 5 exhibiting a corresponding contour, such that the areas 6 of the tool 5 facing the sealant material 3, imprint a specified geometry, for example, packing washers, in the sealant material 3. Application of the hot tool 5 results in the cross-linking of the sealant material 3 to retain the imprinted shape and features.

Following the imprinting process, the oil pan 1 is provided with the finished seal 7.

FIG. 2 shows a partial view through the seal 7 created in the process illustrated in FIG. 1. The surface 4 of the oil pan 1 may be seen and is uncoated with the seal material. By using the tool, packing washers 8 were imprinted in the sealant material 3 (FIG. 1), so that the contours of seal 7 shown resulted.

The temperature of the tool for these purposes is in the range from 150° to 170° C.

Obviously, many modifications and variations of the present invention are possible e in light of the above teachings. It is, therefore, to be understood that within the scope of the appended claims, the invention may be practiced otherwise than as specifically described. The invention is defined by the claims.

What is claimed is:

1. A process for forming a seal on a surface of a component, comprising:

heating the surface of the component applying uncured sealant material onto the heated surface of the component; and contacting the sealant material with a heated shaping tool to shape and cure the sealant material to yield a finished seal on the surface of the component that is imprinted with the shape of the tool.

2. The process of claim 1, wherein an oil pan or cover is selected as the component having a flange face surface onto which the seal is to be formed, and including pre-treating the flange face surface.

3. The process of claim 1 including applying the uncured sealant material by screen printing.

4. The process of claim 1, wherein the sealant material comprises silicone and the tool is heated to a temperature between 150-170° C.

5. The process of claim 1 wherein the sealant material comprises rubber and the tool is heated to a temperature between 150-170° C.

6. The process of claim 4 wherein the silicone sealant material is applied to the surface by screen printing.

7. The process of claim 5 wherein the rubber sealant material is applied to the surface by screen printing.

8. The component of claim 1 wherein the surface comprises a flange face of an oil pan or cover.

9. A process for forming a seal on a surface of a component, comprising:
   heating the surface of the component;
   applying a layer of uncured sealant material to the heated surface of the component;
   providing a tool having a face with a contour corresponding to the desired shape of the seal therein; and
   moving the face of the tool toward the layer of uncured sealant material on the surface of the component and imprinting the material by causing at least a portion of the layer of material to conform substantially with the contour of the tool.

10. The process of claim 9 including heating the negative contour portion of the tool prior to imprinting the material and imprinting the material while the tool remains heated.

11. The process of claim 9 including applying the layer of uncured sealant material by screen printing.

12. The process of claim 9 wherein the uncured sealant material comprises silicone.

13. The process of claim 9 wherein the uncured sealant material comprises rubber.

14. A process for forming a seal on a surface of a component, comprising:
    applying a layer of uncured sealant material to the surface of the component;
    providing a tool having a face with a contour corresponding to the desired shape of the seal therein and heating the contoured face; and
    moving the heated contoured face of the tool toward the layer of uncured sealant material on the surface of the component and imprinting the material by causing at least a portion of the layer of material to conform substantially with the contour of the tool while the tool remains heated.

15. The process of claim 14 including applying the layer of uncured sealant material by screen printing.

16. The process of claim 14 wherein the uncured sealant material comprises silicone.

17. The process of claim 14 wherein the uncured sealant material comprises rubber.

\* \* \* \* \*

UNITED STATES PATENT AND TRADEMARK OFFICE
CERTIFICATE OF CORRECTION

PATENT NO. : 7,442,422 B2  
APPLICATION NO. : 10/844927  
DATED : October 28, 2008  
INVENTOR(S) : Ralf Salameh et al.

Page 1 of 1

It is certified that error appears in the above-identified patent and that said Letters Patent is hereby corrected as shown below:

Column 2, line 30: "with the finished seal 7" should be --with the finished profiled seal 7--

Column 2, line 40: "invention are possible e in light" should be --invention are possible in light--

Column 2, line 49: "heating the surface of the component" should be --heating the surface of the component;--

Signed and Sealed this

Third Day of March, 2009

JOHN DOLL  
*Acting Director of the United States Patent and Trademark Office*